United States Patent
Peña Rodríguez et al.

(10) Patent No.: US 8,657,313 B2
(45) Date of Patent: Feb. 25, 2014

(54) REAR WHEEL STEERING SYSTEM FOR VEHICLES AND VEHICLE COMPRISING SAID SYSTEM

(71) Applicants: Alberto Peña Rodríguez, Donostia-San Sebastian (ES); Iñaki Iglesias Aguinaga, Donostia-San Sebastian (ES); Rafael Teijeiro Castro, Amorebieta (ES); Ivan Seras Escolano, Amorebieta (ES); Imanol Fernández Fontecha, Amorebieta (ES); Guillermo Cadiñanos Bañales, Amorebieta (ES); Javier Lezama Ortiz De Urbina, Alonsotegi (ES); Gorka Agos Esparza, Alonsotegi (ES)

(72) Inventors: Alberto Peña Rodríguez, Donostia-San Sebastian (ES); Iñaki Iglesias Aguinaga, Donostia-San Sebastian (ES); Rafael Teijeiro Castro, Amorebieta (ES); Ivan Seras Escolano, Amorebieta (ES); Imanol Fernández Fontecha, Amorebieta (ES); Guillermo Cadiñanos Bañales, Amorebieta (ES); Javier Lezama Ortiz De Urbina, Alonsotegi (ES); Gorka Agos Esparza, Alonsotegi (ES)

(73) Assignees: Edai Technical Unit A.I.E., Amorebieta (Vizcaya) (ES); Paq Electronics, S.L., Alonsotegi (Bizkaia) (ES); Gat Staff S.L., Amorebieta (Vizcaya) (ES); Fundacion Tecnalia Research & Innovation, Ponostia-Sansebastian (Guipuzcoa) (ES)

( * ) Notice: Subject to any disclaimer, the term of this patent is extended or adjusted under 35 U.S.C. 154(b) by 0 days.

(21) Appl. No.: 13/918,279

(22) Filed: Jun. 14, 2013

(65) Prior Publication Data
US 2013/0334785 A1    Dec. 19, 2013

(30) Foreign Application Priority Data

Jun. 14, 2012 (EP) .................................. 12382240

(51) Int. Cl.
*B62D 7/16* (2006.01)

(52) U.S. Cl.
USPC .................................. 280/93.51; 280/5.52

(58) Field of Classification Search
USPC ............ 280/93.51, 5.52, 5.521, 5.522, 86.75, 280/86.751, 86.754, 86.758
See application file for complete search history.

(56) References Cited

U.S. PATENT DOCUMENTS

| 5,147,008 | A | 9/1992 | Nishimore et al. |
| 6,637,758 | B2 * | 10/2003 | Woo .......................... 280/5.521 |
| 2006/0027986 | A1 | 2/2006 | Ziech |
| 2006/0096800 | A1 * | 5/2006 | Saibold et al. ................ 180/434 |
| 2010/0044979 | A1 * | 2/2010 | Haeusler et al. ........... 280/5.521 |

FOREIGN PATENT DOCUMENTS

| DE | 39 36 246 A1 | 5/1990 |
| DE | 42 19 185 A1 | 12/1992 |
| EP | 0 331 889 A2 | 9/1989 |
| WO | WO 2009/156738 A1 | 12/2009 |

OTHER PUBLICATIONS

European Search Report dated Nov. 29, 2012 issued in corresponding European patent application No. 12 38 2240.

* cited by examiner

*Primary Examiner* — Faye M. Fleming
(74) *Attorney, Agent, or Firm* — Ostrolenk Faber LLP (57) ABSTRACT

The present disclosure relates to a rear wheel steering system for vehicles and vehicle comprising said system which allows rotating the rear wheels by means of a single actuator without increasing the suspended masses, comprising an independent suspension assembly for each rear wheel, wherein each independent suspension assembly comprises a suspension arm having a first end operatively connected to an axle of a wheel, each suspension arm having two second ends which are articulated to a fixed part of the vehicle, each suspension arm being able to rotate with respect to a rotation shaft where the two second ends of each suspension arm are articulated; the system comprising a synchronization device comprising at least one synchronization rod the ends of which are connected by means of sliding carriages to the rotation shafts, each sliding carriage being operatively connected to the axle of each wheel by means of a transmission rod.

8 Claims, 5 Drawing Sheets

REAR WHEEL STEERING SYSTEM FOR VEHICLES AND VEHICLE COMPRISING SAID SYSTEM

FIELD TECHNICAL OF THE INVENTION

The present invention relates to a steering system for vehicles, as well as to a vehicle comprising said system, having application in the automotive industry.

BACKGROUND OF THE INVENTION

In certain vehicles, and more specifically in non-articulated vehicles for commercial use or for transporting passengers, such as vans or large vehicles, vehicle manoeuvrability in curve is greatly improved by means of incorporating the possibility of providing rotation to the wheels of the rear axle.

In this sense, there are various systems for steering the rear wheels of a vehicle today which allow implementing a small steering angle in order to reduce the turning radius of the vehicle. Usually said steering possibility is limited in set-off conditions from standstill and after a specific vehicle speed, respectively, for reasons of space and safety.

An example of such devices or rear wheel steering systems is described in international application no. WO-2009/156738-A1, wherein a rear wheel steering system is shown comprising an independent suspension assembly for each rear wheel, such that each assembly comprises an A-shaped suspension arm known as a trailing arm or semi-trailing arm, each assembly comprising an electric actuator which is supported by each suspension assembly, comprising a moving rod the end of which acts on the axle of each wheel, thus allowing the independent rotation of each wheel. With this device the vehicle turning radius is reduced, increasing its manoeuvrability. Additionally, said international application describes options relating to the activation of said rotation, depending on the state of a rear sliding door and on the vehicle speed, both at the start of the movement and in the case of driving at high speeds.

However, this system has two drawbacks:
- it increases the non-suspended masses since the actuators are assembled on the suspension arms of the vehicle themselves, and
- the wheels may move independently in the opposite directions if an actuator control system fault occurs

DESCRIPTION OF THE INVENTION

A first aspect of the present invention relates to a rear wheel steering system for vehicles which allows rotating the rear wheels of the vehicle by means of a single actuator, whereby the risk of system failure with respect to the cases comprising one actuator per wheel is reduced, all without increasing the non-suspended masses since the elements of the system, such as the actuators for example, are not assembled on the suspension arms of the vehicle.

The system proposed by the invention comprises an independent suspension assembly for each rear wheel, wherein each independent suspension assembly comprises a suspension arm having a first end operatively connected to the axle of a wheel. Likewise, each suspension arm has two second ends which are articulated to a fixed part of the vehicle, such as the chassis, each suspension arm being able to rotate with respect to a rotation shaft in which the two second ends of each suspension arm are articulated.

Therefore, according to the invention, the steering system comprises a sliding carriage assembled in each rotation shaft, wherein the sliding carriage of each independent suspension assembly is operatively connected to the axle of its wheel by means of a transmission rod, and wherein said two sliding carriages are connected to one another by means of a synchronisation device which can be moved with respect to a synchronisation shaft.

The sliding shafts of the sliding carriages therefore coincide with the rotation shafts of the corresponding suspension arms, each sliding carriage being operatively connected to the axle of each wheel by means of a transmission rod, such that the movement of the transmission rod causes the rotation of each wheel by means of actuating the transmission rods on the axle of each wheel, actuating by means of a single synchronisation device simultaneously on the axles of both rear wheels.

The system is basically a rear wheel steering device for vehicles with trailing arm or semi-trailing arm type suspension, with a single actuation acting on the two wheels, and with such actuation arrangement that it allows rotating the rear wheels a specific angle with respect to the direction of movement by means of steering without interfering or generating parasitic forces in the normal operation of the suspension and steering system, eliminating the possible actions of bump steer. The spatial configuration of the system locating its sliding carriages in the rotation shafts of each suspension arm allows completely eliminating the bump steer phenomena, through which forces deviating the wheel from the desired position as the suspension is compressed are generated.

With respect to the rear wheel steering systems of the state of the art, the system of the invention does not increase the non-suspended masses and prevents the wheels from being able to move independently in the opposite directions in the event that the control system of the motor vehicle fails, since the steering of the rear wheels is synchronised by means of a single synchronisation device.

The device of the invention comprises two sliding carriages, each of which can slide with respect to a rotation shaft which is assembled between the two second ends of the suspension arm of each wheel. These two sliding carriages are attached by means of the synchronisation device such that the movement of the synchronisation device causes the angular rotation of the wheels. This system solves the mentioned problem since the two wheels are moved simultaneously and furthermore the system is not suspended or supported by the suspension because the system is completely independent from the suspension since the sliding carriages are placed in the rotation shaft of the suspensions and therefore the movement of the steering is not related to the suspension itself.

The synchronisation device synchronises the movement of the two sliding carriages such that the Ackermann principle with respect to the convergence in the steering angle of the vehicle is met, i.e., when a vehicle turns in a curve, the shafts of all the wheels must meet at a point called instantaneous rotation centre. The axle of an inner steering wheel must therefore rotate an angle greater than that of the corresponding outer wheel of the same shaft, such that in the case of front steering wheels a divergence of the wheels is required when curves are taken to prevent wearing the tyres and to prevent an undesired sliding from happening.

The possibility that the system of the invention comprises an actuation system for dealing with a mechanical fault comprising at least one spring on each side of each sliding carriage, such that if one of the rods of the system breaks the springs bring the carriage to the central position is contemplated. This is the safest option, although the springs could also be in the rods. One end of the spring is generally attached to the chassis of the vehicle and the other end to a carriage or to one of the rods. It is contemplated that this actuation system for dealing with faults comprises a locking system fixing the carriage once it is in the safe position.

On the other hand, it is contemplated that the system comprises an actuation system for dealing with an electronic fault comprising a supervising control configured for detecting an electronic fault and ordering the carriage to be brought to the safe position.

The possibility that the synchronisation device is operatively connected to an actuator which can actuate said synchronisation device, causing the rotation of the rear wheels is contemplated. The actuator is preferably a linear electric actuator. Therefore, with respect to the rear wheel steering systems of the state of the art, the system of the invention does not increase the non-suspended masses since the actuators are not assembled on the suspensions themselves, but can be fixed to the chassis of the vehicle. There is an actuator on the synchronisation device which can thus move the synchronisation device causing the angular rotation of the wheels.

A second aspect of the invention relates to a vehicle comprising a rear wheel steering system such as the one described above.

DESCRIPTION OF THE DRAWINGS

To complement the description which is being made and for the purpose of aiding to better understand the features of the invention according to a preferred practical embodiment thereof, a set of drawings is attached as an integral part of said description in which the following has been depicted with an illustrative and non-limiting character.

PREFERRED EMBODIMENT OF THE INVENTION

In light of the described drawings it can be seen how in one of the possible embodiments of the invention the system proposed by the invention comprises an independent suspension assembly (1) for each rear wheel (2), wherein each independent suspension assembly (1) comprises a triangular-shaped suspension arm (3), wherein a first end (4) is operatively connected to an axle (5) of a wheel (2).

Likewise, each suspension arm (3) has two second ends (6) which are articulated to a fixed part of the vehicle, such as the chassis, each suspension arm (3) being able to rotate with respect to a rotation shaft (7) in which the two second ends (6) of each suspension arm (3) are articulated. Likewise, each independent suspension assembly (1) can comprise a spring (15) and a shock absorber (16) operatively connected to each suspension arm (3).

As seen in the FIGS. 1 to 4, an embodiment of the steering system comprises a synchronisation device (12) consisting of a synchronisation rod (12) the ends of which are connected by means of sliding carriages (8) to the rotation shafts (7), each sliding carriage (8) being operatively connected to the axle (5) of each wheel (2) by means of a transmission rod (11), such that the movement of the transmission rod (12) causes the rotation of each wheel (2), by means of actuating the transmission rods on the axle (5) of each wheel (2), actuating by means of a single synchronisation rod (12) simultaneously on the axles of both rear wheels (2). Each wheel (2) can rotate a specific angle with respect to an axis of rotation (13) defined by the connection at two points between the suspension arm (3) and the axle (5) of each wheel (2), thus rotating with respect to the direction of movement (14) of the vehicle.

On the other hand, FIGS. 2 and 5 to 7 depict another embodiment of the system in which the synchronisation device (12) comprises a central synchronisation rod (12') which is guided with respect to an axis of synchronisation (19), wherein each end of the central synchronisation rod (12') is articulated to one end of a side synchronisation rod (12"), the opposite ends of which are connected to each sliding carriage (8).

This embodiment constitutes an alternative solution comprising three rods (12', 12"). Two side rods (12") attached at one end to each of the carriages (8) and at the other end to the ends of a central synchronisation rod (12') which can be moved in a guided manner along an axis of synchronisation (19), for example by means of guides (17) fixed in the chassis of the vehicle.

Figure 1:
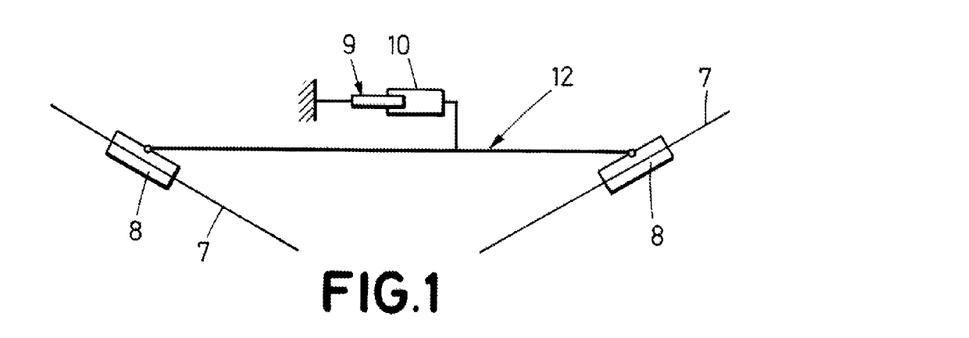
FIG. 1 shows a schematic view of an embodiment of the system of the invention, in which the synchronisation device comprises a single transmission rod.
Figure 2:
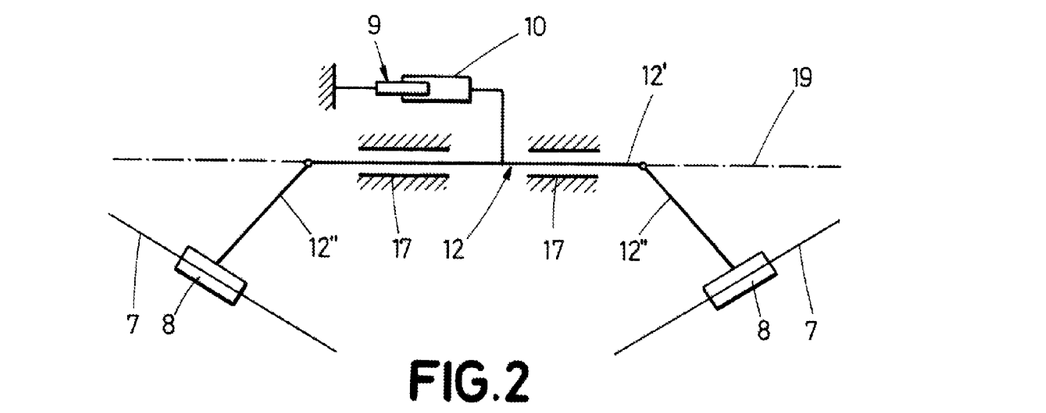
FIG. 2 shows a schematic view of another embodiment of the system of the invention, in which the synchronisation device comprises a central synchronisation rod guided with respect to the frame of the vehicle and the ends of which are linked to side synchronisation rods.
Figure 3:
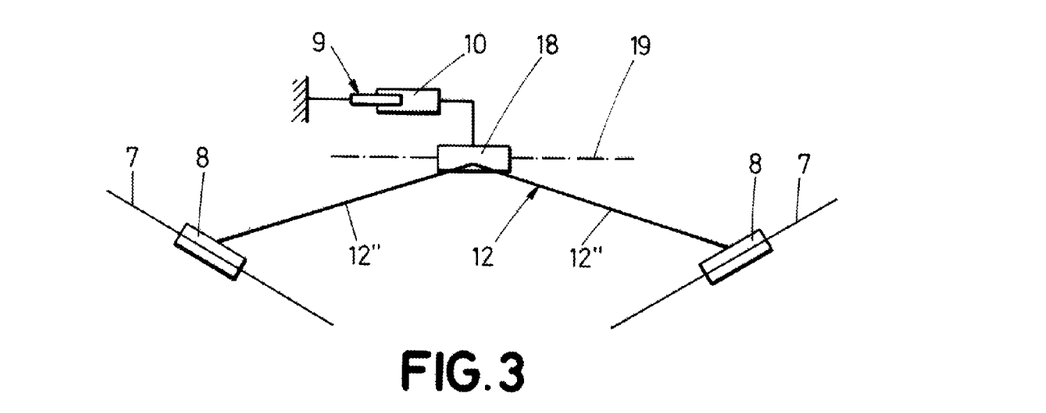
FIG. 3 shows a schematic view of another embodiment of the system of the invention, in which the synchronisation device comprises two side synchronisation rods linked to one another by means of a central sliding carriage the movement of which, like in the embodiment depicted in FIG. 2, is guided with respect to a synchronisation shaft.
Figure 4:
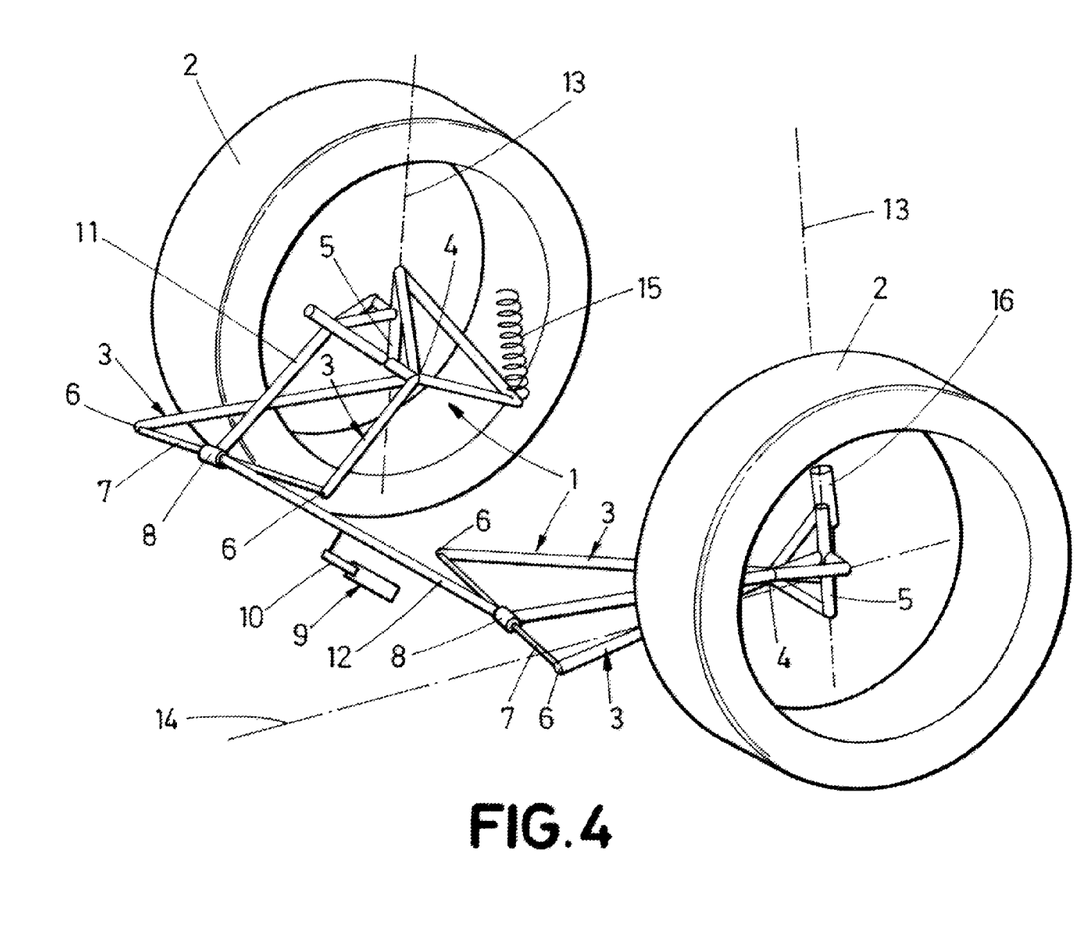
FIG. 4 shows a perspective schematic view of the rear wheel steering system for vehicles schematically depicted in FIG. 1 viewed from the front.
Figure 5:
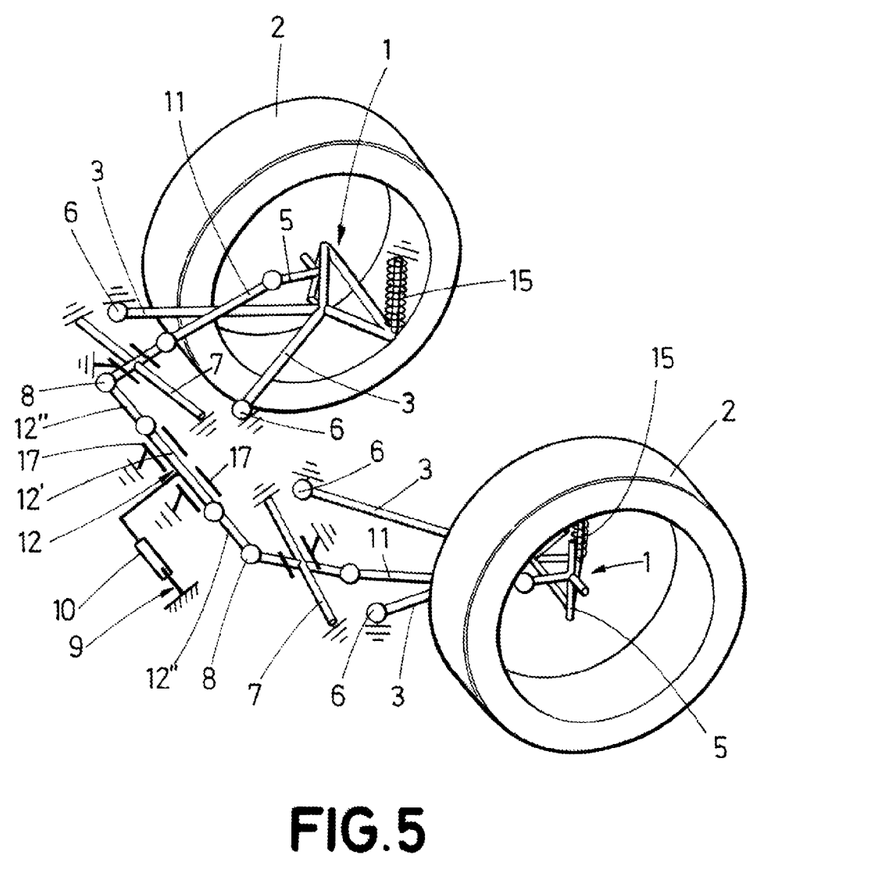
FIG. 5 shows a perspective schematic view like that of FIG. 4 of the system schematically depicted in FIG. 2.
Figure 6:
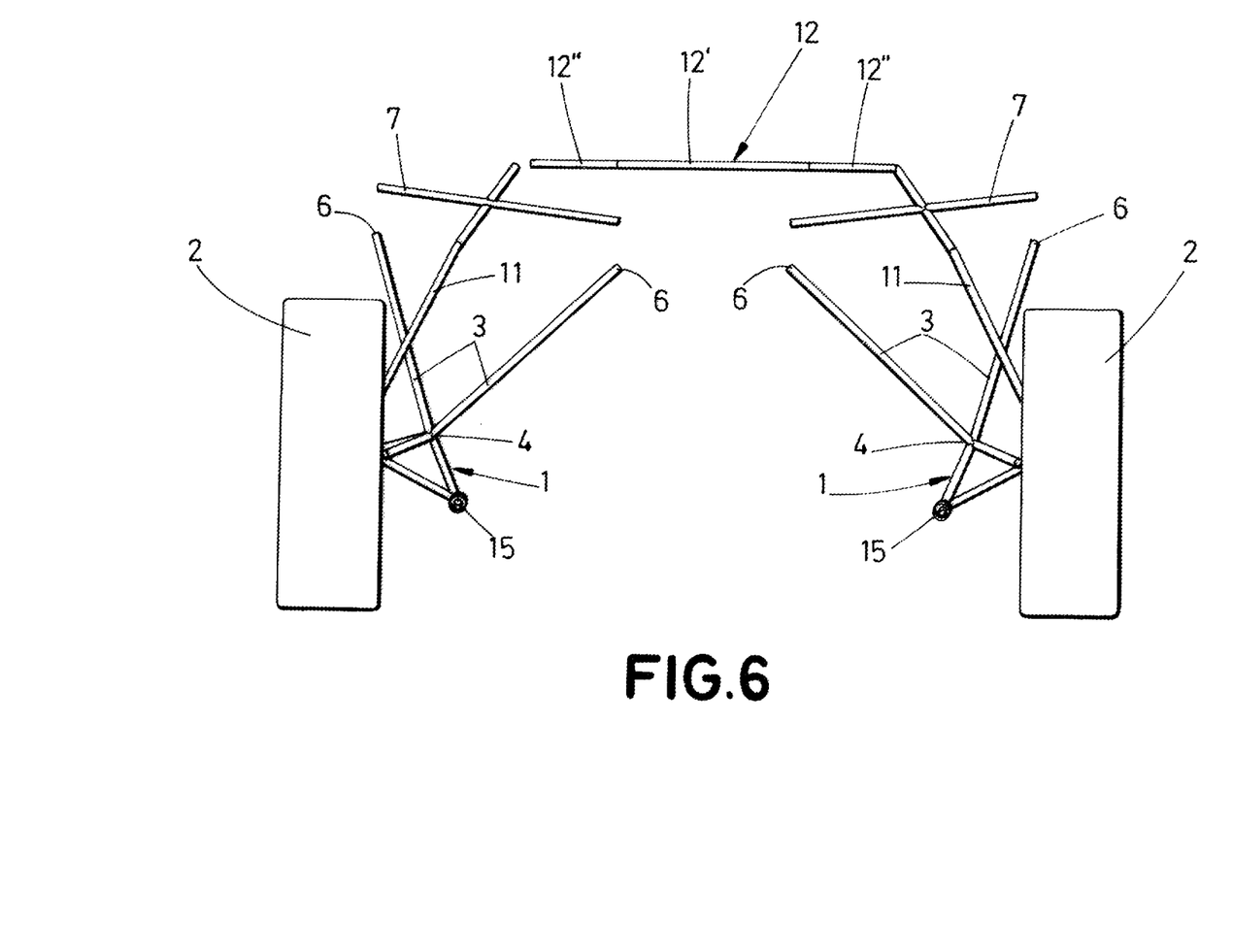
FIG. 6 shows an elevational schematic view of the system depicted in FIG. 5 viewed from the back.
Figure 7:
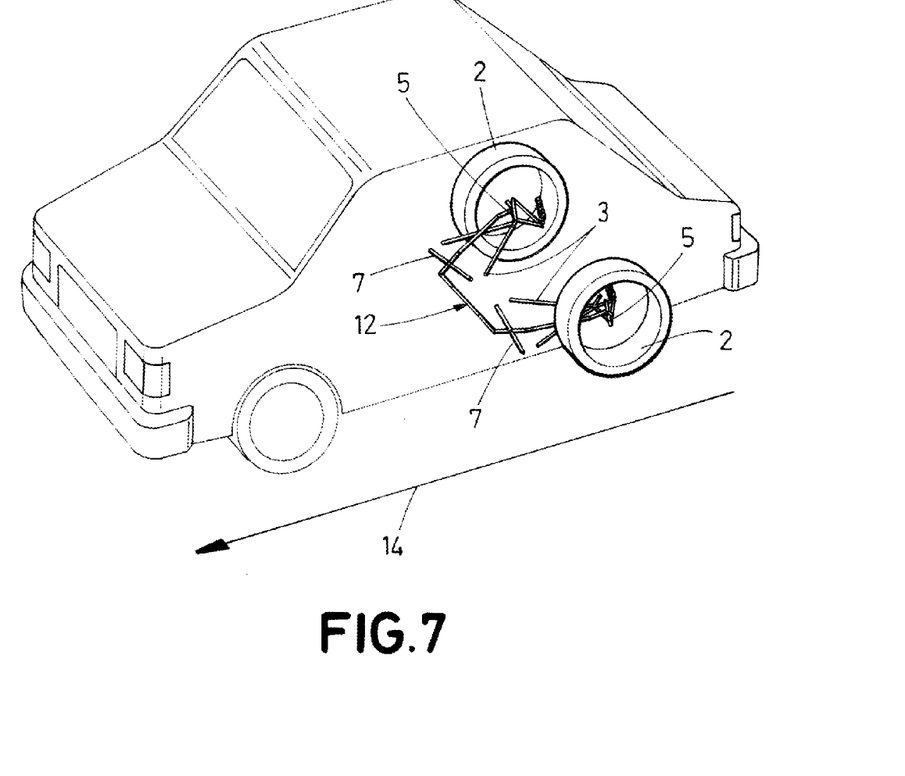
FIG. 7 shows a perspective schematic drawing of an embodiment of a vehicle according to the invention, in which the embodiment of the rear wheel steering system depicted in FIGS. 2, 5 and 6 can be seen.

Likewise, FIG. 3 depicts another embodiment of the system in which the synchronisation device (12) comprises two side synchronisation rods (12") which are connected to a central sliding carriage (18) with ability for being moved along an axis of synchronisation (19) each side synchronisation rod (12") being connected with each sliding carriage (8) at an end opposite to that of the central sliding carriage (18).

According to any of the preceding embodiments, the synchronisation device (12) is operatively connected to an actuator (9) which can actuate said synchronisation device (12), causing the rotation of the rear wheels (2). The actuator (9) is preferably a linear electric actuator comprising an extendible rod (10) which is connected to the synchronisation device (12), such that it can rotate the wheels (2). Specifically, in the embodiment shown in FIGS. 1 to 4 the actuator (9) acts on the synchronisation rod (12). In the embodiment shown in FIGS. 2, 5 and 7 the actuator acts on the central synchronisation rod (12'). Finally, in the embodiment shown in FIG. 3 the actuator (9) acts on the central sliding carriage (18).

In view of this description and set of drawings, the person skilled in the art could understand that the embodiments of the invention which have described can be combined in many ways within of the object of the invention. The invention has been described according to several preferred embodiments thereof, but for the person skilled in the matter it will be evident that many variations can be introduced in said preferred embodiments without exceeding the object of the claimed invention.

The invention claimed is:

1. Rear wheel steering system for vehicles comprising an independent suspension assembly for each rear wheel, wherein each independent suspension assembly comprises a suspension arm having a first end operatively connected to an axle of a wheel, each suspension arm having two second ends which are articulated to a fixed part of the vehicle, each suspension arm being able to rotate with respect to a rotation shaft in which the two second ends of each suspension arm are articulated, wherein the steering system comprises a sliding carriage assembled in each rotation shaft, wherein the sliding carriage of each independent suspension assembly is operatively connected to the axle of its wheel by means of a transmission rod, and wherein said two sliding carriages are connected to one another by means of a synchronization device which can be moved with respect to an axis of synchronization.

2. Rear wheel steering system for vehicles according to claim 1, wherein the synchronization device consists of a synchronization rod the ends of which are connected to the sliding carriages assembled in the rotation shafts.

3. Rear wheel steering system for vehicles according to claim 1, wherein the synchronization device comprises a central synchronization rod which is guided with respect to the axis of synchronization, wherein each end of the central synchronization rod is articulated to one end of a side synchronization rod, the opposite ends of which are connected to each sliding carriage.

4. Rear wheel steering system for vehicles according to claim 1, wherein the synchronization device comprises two side synchronization rods which are connected to a central sliding carriage with ability for being moved along the axis of synchronization, each side synchronization rod being connected with a sliding carriage at an end opposite to that of the central sliding carriage.

5. Rear wheel steering system for vehicles according to claim 1, wherein the synchronization device is operatively connected to an actuator which can actuate said synchronization device, causing the rotation of the rear wheels.

6. Rear wheel steering system for vehicles according to claim 1, comprising an actuation system for dealing with a mechanical fault comprising at least one spring on each side of each sliding carriage, such that if one of the rods of the system breaks the springs bring the carriage to a central position.

7. Rear wheel steering system for vehicles according to claim 1, comprising an actuation system for dealing with an electronic fault comprising a supervising control configured for detecting an electronic fault and ordering the carriage to be brought to a safe position.

8. Vehicle comprising a rear wheel steering system according to claim 1.

* * * * *

UNITED STATES PATENT AND TRADEMARK OFFICE
CERTIFICATE OF CORRECTION

PATENT NO. : 8,657,313 B2  
APPLICATION NO. : 13/918279  
DATED : February 25, 2014  
INVENTOR(S) : Peña Rodriguez et al.

It is certified that error appears in the above-identified patent and that said Letters Patent is hereby corrected as shown below:

On the title page, Item [73] should read:

[73] Assignees: Edai Technical Unit A.I.E., Amorebieta (Vizcaya) (ES);
P4Q Electronics, S.L., Alonsotegi (Bizkaia) (ES);
Gat Staff S.L., Amorebieta (Vizcaya) (ES);
Fundacion Tecnalia Research & Innovation, Donostia-San Sebastian (Guipuzcoa) (ES)

Signed and Sealed this
Sixteenth Day of September, 2014

Michelle K. Lee
*Deputy Director of the United States Patent and Trademark Office*